Aug. 1, 1933.　　　　　J. W. SILVER　　　　1,920,485
VEHICLE FOR COLLECTION AND HAULING OF GARBAGE
Filed May 27, 1929　　　3 Sheets-Sheet 1
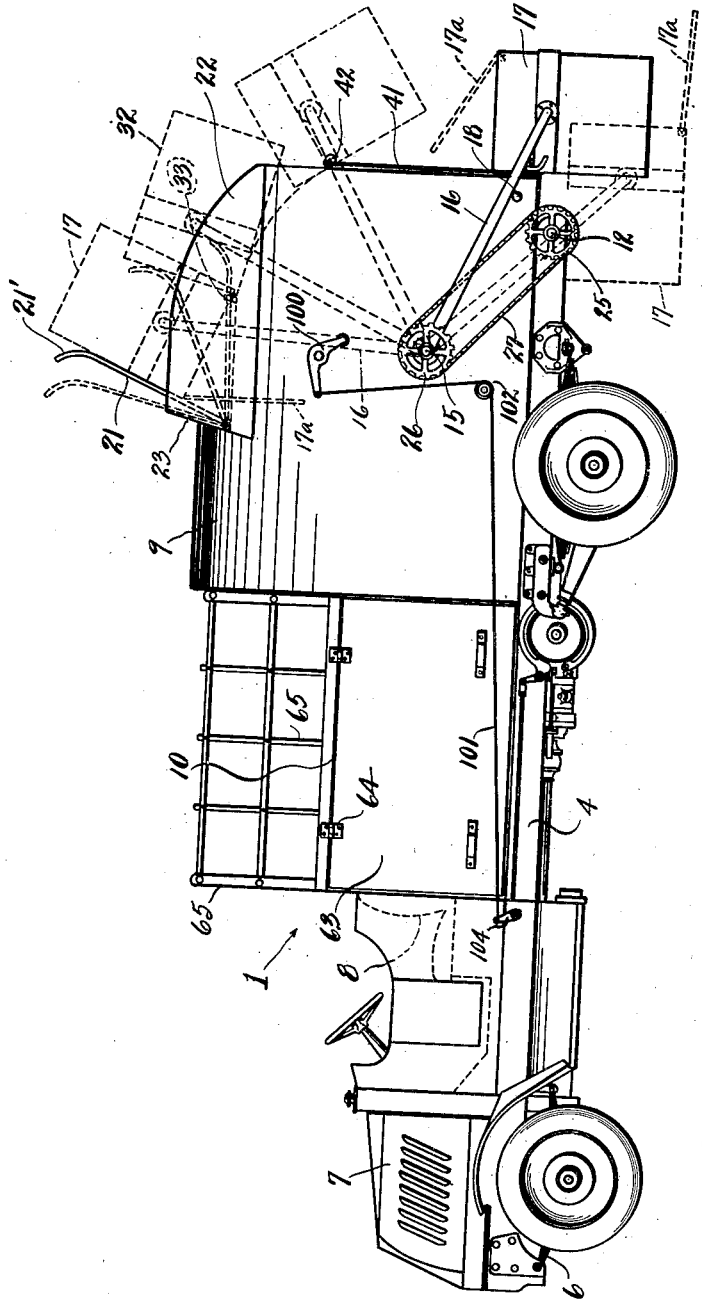
INVENTOR
JESSE W. SILVER
BY
Cook + Robinson
ATTORNEY Aug. 1, 1933.   J. W. SILVER   1,920,485
VEHICLE FOR COLLECTION AND HAULING OF GARBAGE
Filed May 27, 1929   3 Sheets-Sheet 2
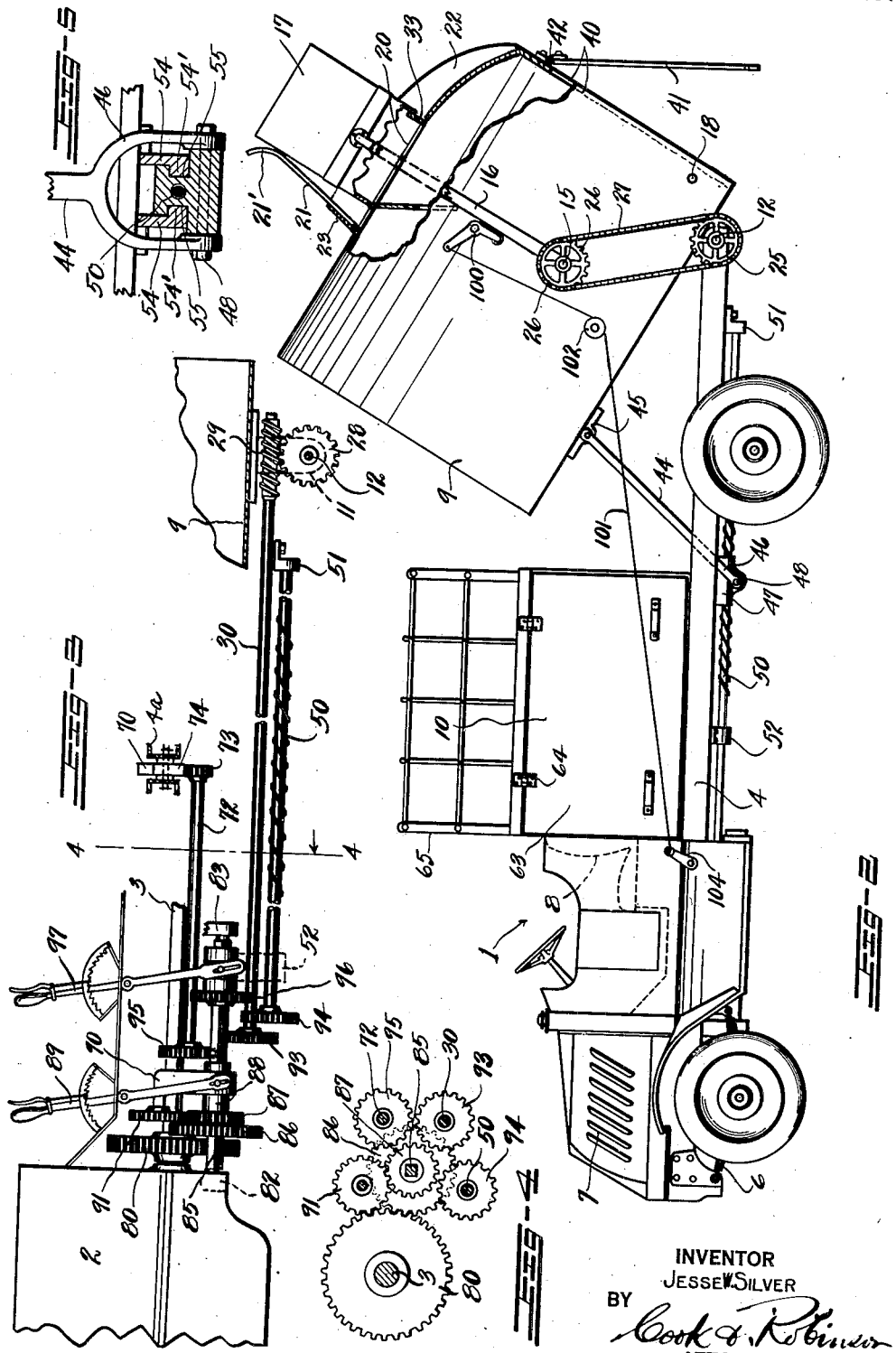
INVENTOR
JESSE W. SILVER
BY
*Cook & Robinson*
ATTORNEY Aug. 1, 1933.  J. W. SILVER  1,920,485
VEHICLE FOR COLLECTION AND HAULING OF GARBAGE
Filed May 27, 1929     3 Sheets-Sheet 3
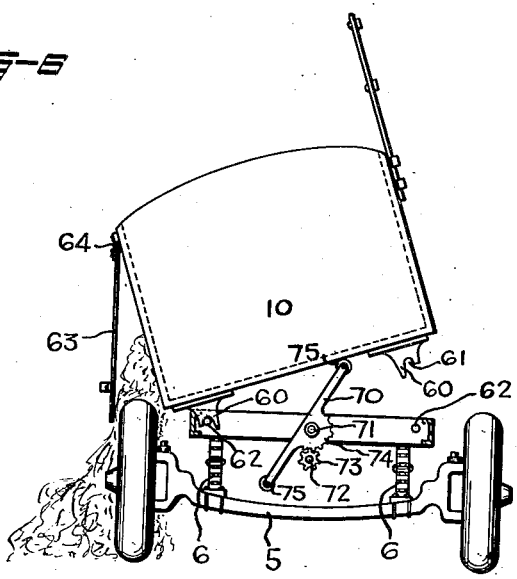
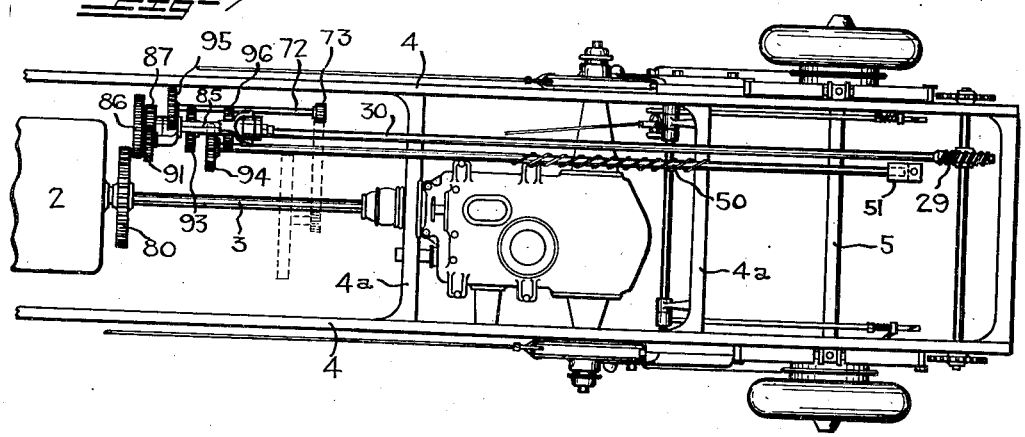
INVENTOR
JESSE W. SILVER
BY
ATTORNEY Patented Aug. 1, 1933

1,920,485

UNITED STATES PATENT OFFICE 1,920,485

VEHICLE FOR COLLECTION AND HAULING OF GARBAGE

Jesse W. Silver, Tacoma, Wash., assignor to Sanitary Garbage Body Mfg. Co., a Corporation of Washington Application May 27, 1929. Serial No. 366,280

3 Claims. (Cl. 214—67)

This invention relates to improvements in vehicles designed especially for the collection and hauling of garbage and the principal object of the invention is to provide means whereby the garbage may be more easily loaded into and dumped from the vehicle than heretofore, which is of a more sanitary character and easily operable through connection with the motive power of the vehicle. More specifically, the invention resides in the provision of a vehicle of the above character including means that are mechanically controlled and actuated under control of the vehicle operator whereby the garbage, as collected, may be picked up within a loading bucket and dumped into the main body or storage tank. Also, whereby the storage tank may be tilted upwardly and its contents dumped therefrom through an end door.

It is also an object to insure sanitation and prevent the escape of offensive odors by providing the storage tank of the vehicle with a receiving opening at the top which is normally closed by a hingedly attached cover that will be automatically moved to open position by actuation of the loading bucket to dumping position and which will automatically close incident to return movement of the bucket to loading position.

It is also an object of the invention to provide the vehicle with an additional box for dry or unoffensive materials, that may be dumped laterally of the vehicle in either direction.

Other objects of the invention reside in the transmission mechanism for actuating the various parts and in the automatically operated trips used in connection therewith.

Other objects reside in the various details of construction and in the combination of parts and in their mode of operation as will hereinafter be described.

In accomplishing these objects, I have provided the improved details of construction, the preferred forms of which are illustrated in the accompanying drawings, wherein—

Figure 1 is a side view of a garbage collecting truck or vehicle embodying the present invention.

Figure 2 is a similar view showing the receiving tank in dumping position, and showing also the worm shaft through which it is moved to and from dumping position.

Figure 3 is a side elevation of the transmission gearing whereby the loading and dumping action of the tank is controlled.

Figure 4 is a front elevation taken on line 4—4 in Figure 3, showing the relation of gears of the transmission mechanism.

Figure 5 is a sectional detail illustrating the mounting of the block on the worm shaft and its means of support.

Figure 6 is a cross section illustrating the lateral dumping of the box or receptacle for dry material.

Figure 7 is a plan view of the vehicle chassis.

Referring more in detail to the drawings—

1 designates, in its entirety, what may be an automobile truck of any suitable make and equipped with an engine which may be of the usual type, as designated at 2 in Figure 3, and which would be connected to propel the vehicle through its rear wheels as in the ordinary manner, or in any other suitable way if such should be desired. In Figure 3 a part of the drive shaft that extends from the engine to the differential mechanism of the rear axle, is designated at 3, but the actual connection of this shaft with the axle, or with the usual change speed transmission gearing, is not shown.

The vehicle chassis would comprise the usual, opposite side beams 4—4 joined by the cross pieces 4a and to which the front and rear axle 5—5 are attached through the intermediacy of springs 6. At the forward end of the chassis is the hood 7 which encloses the engine 2 and rearwardly of this, is the driver's and operator's seat 8. At the rear of the chassis is the rearwardly tiltable tank 9 for wet and offensive material and between this and the driver's seat is the box or bin 10 for dry or unoffensive materials.

One of the important features of this invention pertains to the construction of the tank 9 and the parts directly associated therewith. As shown, the tank is of box-like, rectangular form, with a rounded, closed top. The tank rests on the beams 4—4 and near its rear end, at the under side, has brackets 11 fixed thereto and these serve to pivotally or swingingly attach the tank to a cross shaft 12 in a manner which permits the tank to be tilted rearwardly by lifting its forward end. The shaft 12 is revoluble in suitable bearings 13 fixed to the beams of the chassis and it serves, as will presently be described, as a part of the mechanism for operating the loading bucket whereby garbage is picked up and delivered into the tank.

Extended transversely through the tank and revolubly supported in the opposite side walls thereof, is a shaft 15, the ends of which extend beyond the sides of the tank, and keyed or otherwise fixed to these extended ends at opposite sides of the tank, are paired arms 16—16 which pivotally support between them at their swinging ends, a loading bucket 17 of rectangular form. Removably mounted studs 18 project from the side walls of the tank to support the arms when the bucket is in loading position, as shown in full lines in Figure 1. These studs may be withdrawn to permit the arms to swing downwardly to such position that the bucket may be placed flatly on the ground with its top end facing rearwardly so that rubbish or garbage may be swept thereinto. A cover 17a may be attached to the bucket if such is desired, but in this event it would be pivotally attached to the rearward top edge thereof so as not to interfere with dumping, as will presently be described.

A receiving opening 20 is provided in the top, rear portion of the tank, and this is normally covered by a lid 21 which is hingedly attached to the body along the forward edge of the opening and is designed to swing upwardly and forwardly. The rear, or swinging edge of the cover, is curved upwardly, as at 21'. Side boards or flanges 22—22 are fixed to the body at opposite sides of the opening and these are connected at their forward ends by a cross piece 23. These parts serve to prevent material dumped from the bucket spilling over the sides of the tank and also direct it all into the opening 20. The part 23 serves also to limit the opening movement of the cover 21 so that it will fall back to closed position of its own weight when the loading bucket is returned from dumping position.

The actuation of the bucket between loading and dumping positions is effected by rotatably driving the cross shaft 12 in opposite directions. This shaft, at its ends, or at one end, is equipped with sprocket wheels 25, aligned with sprocket wheels 26 at the ends of cross shaft 15, with sprocket chain belts 27 extended about the paired sprockets. Therefore, rotation of shaft 12, effects a corresponding rotation of shaft 15 and a consequent swinging of the arms 16 for raising or lowering the bucket. The shaft 12, is equipped, as in Figure 3, with a spiral gear 28 meshing with a worm gear 29 on a drive shaft 30 which is adapted to be driven in a selected direction by the manipulation of the transmission gearing presently described.

Actuation of the shaft 12 in a direction for raising and dumping the bucket causes the arms 16—16 to swing upwardly and thereby carry the bucket through the several dotted line positions illustrated in Figure 1, and along an arcuately curved top wall portion of the truck so that its top edge is brought into contact with the upwardly curled, rearward edge 21' of the cover 21. This causes the cover to be forced upwardly toward open position. When the bucket has reached a certain advanced position, as designated in the dotted line position 32 in Figure 1, its forward edge engages a stop 33 that is fixed to the tank adjacent the rear edge of the receiving opening and then the continued advancement of the arms 16 causes the bucket to be inverted and its contents dumped through the opening into the tank.

At the rear of the tank is a discharge opening 40 normally closed by a rearwardly opening door or cover 41 that is hingedly attached to the tank along its top edge, as at 42. This cover or door may be fitted to the tanks in a water tight joint and provided with any suitable locking means for holding it closed. Garbage is dumped from the tank through the rear end opening by tilting the tank rearwardly and this is accomplished through the medium of a link or push bar 44, see Figure 2, which is pivotally attached to the bottom wall toward the forward end of the tank, as at 45, and at its other end has a yoke 46, see Figure 5, the arms of which extend on opposite sides of a block or nut 47 to which they are pivotally fixed by a transverse pin or bolt 48. The block or nut 47 is threaded onto a worm shaft 50 that extends lengthwise of the vehicle and revolubly mounted in suitable supporting bearings, as at 51 and 52. The shaft 50 is adapted to be driven in either direction, as presently described, to cause the nut 47 to move rearwardly or forwardly therealong and, in this way, to raise or lower the tank.

As a feature of construction which is considered to be important, the block 47 is slidably contained between two parallel supporting beams 54—54 fixed to the cross beams 4a of the chassis, and these beams 54—54 have inwardly directed ribs, or flanges, 54' projected into grooves 55 in opposite sides of the nut so as to substantially support and accurately guide the nut in its travel. This removes all strain from the worm shaft and it may be made relatively small.

The box 10 rests on the beams 44 and is retained in position thereon by brackets 60 fixed to its under wall. Each bracket has a downwardly opening recess 61 therein which receives pins 62 projecting from cross bars or beams 4a. The box may be tilted laterally in either direction, as in Figure 6, and when so tilted it pivots on the pins 62 located at the side toward which it is tilted. Doors 63 are provided at the opposite sides of the box and these are hinged at their upper edges, as at 64, and swing outwardly at their lower edges. Any suitable means may be provided for retaining these doors closed. Also, extension frames or side boards, as at 65, may be attached to the top edges of this box to increase its capacity.

For mechanically dumping this box, I have provided the rocker bar 70 that is disposed transversely of the chassis and is fixed centrally between its ends on a pivot 71. Below this and extending in the longitudinal direction of the chassis, is a shaft 72 on which a small gear 73 is fixed in mesh with a gear segment 74 formed with the rocker. Rotation of the shaft 72 is under control of the transmission mechanism, presently described, and rotation in opposite directions causes opposite tilting of the bar 70 which, at its ends, has rollers 75 engageable with the under wall of the box. Upward movement of one end of the lever brings it against the box to lift it at that side and cause the box to pivot on the retaining bracket at the opposite side to thereby cause the box to discharge its contents. The direction of tilting is dependent of course on the direction of rotation of shaft 72 and this is controllable through the transmission gearing.

The transmission mechanism, whereby the several devices previously described are controlled, is shown in Figures 3 and 4, wherein 2 designates the vehicle engine, 3 the drive shaft to the rear wheels and 80 a gear fixed to the drive shaft and continuously rotating therewith. It will be here stated that the usual transmission gearing for obtaining various speeds and directions of the vehicle, may be interposed between the engine and gear 80 if such is desired and gear 80 mounted not on the crank shaft, but on a shaft included in the transmission mechanism and operable at a lower speed than crank shaft speed.

Mounted parallel with shaft 3 and revoluble in suitable supports, as at 82—83, is a shaft 85 that is squared and along which integrally formed gears 86 and 87 are slidable. These gears have a hub portion 88 to which a shifting lever 89 is operatively attached and whereby gear 86, which is larger than gear 87, may be moved into and from mesh with gear 80. A bracket or arm 90 is fitted about the hub 88 so that the latter may revolve therein and at the end of the arm is an idler gear 91 always in mesh with gear 87 and which is adapted to be adjusted into mesh with gear 80 for the purpose of driving the squared shaft 85 in a reverse direction to that in which it is driven by gear 86. The lever 89 is designed to prevent rotative movement of the arm 90 about shaft 85. The forward ends of the shafts 30, 50 and 72 terminate at equal radial distances about the squared shaft, and keyed on the ends of these shafts, respectively, are gear wheels 93, 94 and 95 which are adapted to be separately engaged and driven by a gear 96 slidably mounted on the squared shaft and shiftable thereon to various positions by a shifting lever 97.

Assuming the device is to be so constructed, its operation would be as follows:

Starting with the parts as shown in full lines in Figure 1, when the bucket 17 has been loaded, the operator starts the dumping motion by first shifting the lever 89 to move the gear 86 into mesh with gear 80. This causes the shaft 85 to rotate. He then manipulates the lever 97 in such manner as to bring the gear 96 into mesh with gear 93, thereby causing the shaft 30 to rotate and, through the gears 29 and 28, to rotate the shaft 12. Rotation of the shaft 12, through the sprockets 25, 26 and chain 27, causes rotation of the shaft 15 to swing the arms 16 upwardly, thereby carrying the bucket upwardly and over the end of the tank to bring its forward, top edge against the cover 21 to raise the latter and finally causing the bucket to engage the stop 33 so that it will be inverted and its contents dumped into the tank through the top opening thereof. When the bucket reaches dumping positon, farther advance movement of the arms 16 is prevented by their coming into contact with a trip mechanism which consists of a bell crank lever 100 that is fixed to the side wall of the tank and which is connected, by means of a cable 101 passing over suitable guide pulleys 102, to a trip 104, whereby the lever 89 will be moved so as to disengage the driving gear 86 from the gear 83. To return the bucket to loading position, the operator shifts the lever 89 so as to bring the gear 91 into mesh with the gear 80. This reverses the direction of shaft 85 and shaft 30 and thereby returns the bucket to loading position. If it is desired to place the bucket in position against the ground's surface so that the material may be swept into it, the supporting studs 18 are withdrawn and this will permit the arms 16 to swing downwardly and the bucket to be placed against the ground. When it is desired to dump the tank, the operator adjusts the lever 89 to place the shaft 85 in motion and then, by the lever 97, shifts the gear 96 into mesh with the gear 94 to thereby drive the shaft 50. This causes the nut 47 to be moved rearwardly along the shaft 50 and thereby, through the link 44, to raise the forward end of the tank so that its contents may be dumped therefrom through the rear opening 40. To return the tank to normal position, the direction of rotation of the shaft 50 is reversed by shifting the gear 91 into mesh with gear 80 while gear 86 is disengaged therefrom. For the purpose of tilting the box 10 laterally, the operator shifts the gear 96 into mesh with gear 95. The direction of tilting, of course, would be governed according to the direction of rotation of shaft 72 and this is dependent on which of the gears, 86 or 87, is brought into mesh with the gear 80.

It is readily apparent that with a device of this character garbage may be easily and conveniently handled and that no offensive odors will escape from the tank. All the various operating mechanisms are at the command of the driver and can be operated by him.

Having thus described my invention, what I claim as new therein and desire to secure by Letters-Patent, is:

1. In a vehicle of the character described, a storage tank having a top opening, a supporting shaft about which the tank may pivot for rear end dumping, a cover normally covering the tank opening and hingedly attached to the tank at the forward edge of the opening to swing upwardly and forwardly to open position and having an upwardly curved flange at its opening edge, a stop fixed to the tank adjacent the rearward edge of the opening, a bucket support, pivotally attached to opposite sides of the tank, a bucket suspended from the support, means operable through the tank supporting shaft for actuating the support to carry the bucket from loading position to a position for engaging said cover flange to move the latter to open position and for subsequently causing the bucket to engage said stop so that a farther movement of the support causes the bucket to be inverted to discharge its contents into the tank through said top opening.

2. In a vehicle having a dump tank supported for movement about a pivot shaft, means for rotating the pivot shaft in opposite directions, a cross shaft extended through the tank, a pair of arms swingingly mounted on the latter shaft at opposite sides of the tank and extended rearwardly thereof, a loading bucket pivotally mounted between said arms, means operatively connecting the pivot shaft with the second shaft for rotating it to actuate said arms to move the bucket between loading and dumping positions.

3. In a vehicle of the character described, a storage tank having a top opening, a bucket carrier swingingly attached to the tank and extended rearwardly thereof, a bucket pivotally suspended from the carrier, means for actuating the carrier to move the bucket from loading position at which it is in an upright position, to dumping position at which it is inverted and its contents delivered into the tank, a removable stud in the tank engageable by the carrier to limit the downward movement of the bucket; said stud being removable to permit farther downward movement of the carrier for the placement of the bucket against the ground's surface in a rearwardly or forwardly opening position, and a cover hingedly attached to the bucket edge and adapted to open flatly against the ground when the bucket is in this latter position.

JESSE W. SILVER.